(12) United States Patent
Evans (10) Patent No.: US 12,106,372 B1
(45) Date of Patent: Oct. 1, 2024

(54) SYSTEM AND METHOD FOR CRYPTOCURRENCY TRADING

(71) Applicant: Alchemy Crypto Inc., St. Augustine, FL (US)

(72) Inventor: William Robert Evans, St. Augustine, FL (US)

(73) Assignee: Alchemy Crypto Inc., St. Augustine, FL (US)

( * ) Notice: Subject to any disclaimer, the term of this patent is extended or adjusted under 35 U.S.C. 154(b) by 0 days.

(21) Appl. No.: 18/613,670

(22) Filed: Mar. 22, 2024

Related U.S. Application Data (60) Provisional application No. 63/550,247, filed on Feb. 6, 2024.

(51) Int. Cl.
*G06Q 40/00* (2023.01)
*G06Q 40/04* (2012.01)

(52) U.S. Cl.
CPC ......... *G06Q 40/04* (2013.01); *G06Q 2220/00* (2013.01)

(58) Field of Classification Search
USPC .................................................. 713/150, 182
See application file for complete search history.

(56) References Cited

U.S. PATENT DOCUMENTS

| | | | | |
|---|---|---|---|---|
| 9,294,281 | B2 * | 3/2016 | Schechter | H04L 9/3239 |
| 10,102,510 | B2 * | 10/2018 | Yau | G06Q 20/3829 |
| 10,516,530 | B2 * | 12/2019 | Dewitt | H04L 9/0861 |
| 10,878,415 | B1 | 12/2020 | Yang et al. | |
| 2005/0108546 | A1 * | 5/2005 | Lehew | H04L 63/06 |
| | | | | 713/182 |
| 2011/0302406 | A1 * | 12/2011 | Machani | H04L 9/0897 |
| | | | | 713/150 |
| 2018/0159833 | A1 * | 6/2018 | Zhang | H04L 9/3297 |
| 2021/0027369 | A1 | 1/2021 | Raheman et al. | |
| 2021/0056628 | A1 | 2/2021 | Jang et al. | |
| 2023/0044043 | A1 | 2/2023 | Johnson | |
| 2023/0237575 | A1 | 7/2023 | Shimada et al. | |

OTHER PUBLICATIONS

Levus et al., "Intelligent System for Arbitrage Situations Searching in the Cryptocurrency Market", CEUR-WS, Jun. 5, 2021, pp. 407-440, vol. 2917, paper 32, http://ceur-ws.org/Vol-2917/paper32.pdf.

(Continued)

*Primary Examiner* — Olabode Akintola
(74) *Attorney, Agent, or Firm* — Lippes Mathias LLP; Mitchell Ghaneie; Josephine Chen (57) ABSTRACT

The present disclosure presents a system and methodology for cryptocurrency trading. The system comprises a home-based trading machine, one or more servers and at least one database, each of which communicating via a network. The home-based trading machine is configured to encrypt at least one set of API credentials accessible to at least one currency exchange application in an encrypted packet; receive, from an electronic processing device operable by a vendor of the encrypted packet, the encrypted packet; implement the encryption key to decrypt the API key and the API secret key to unlock the encrypted packet to perform a cryptocurrency trade; and upon completion of the cryptocurrency trade, re-encrypt the API credentials.

20 Claims, 11 Drawing Sheets

(56) References Cited

OTHER PUBLICATIONS

Revuelta, "Design and implementation of a software system for the composition of a database and automated trading system on different cryptocurrency trading markets", Master's thesis, Mar. 18, 2018, Swiss Federal Institute of Technology (ETH) Zurich, https://upcommons.upc.edu/bitstream/handle/2117/169670/Master%20thesis.pdf?sequence=1.

Nawaz et al., "Edge computing to secure iot data ownership and trade with the ethereum blockchain", MDPI, Jul. 16, 2020, Sensors 20, No. 14: 3965, https://www.mdpi.com/1424-8220/20/14/3965/pdf.

\* cited by examiner

SYSTEM AND METHOD FOR CRYPTOCURRENCY TRADING

CROSS-REFERENCE TO RELATED APPLICATION

This application claims the benefit of U.S. Provisional Application No. 63/550,247, filed Feb. 6, 2024, and is hereby incorporated by reference in its entirety for all purposes.

FIELD OF THE INVENTION

The subject matter disclosed herein generally relates to a system and method for trading cryptocurrencies and more specifically to a system and method for cryptocurrency trading comprising a home-based trading machine.

A home-based trading machine with custom hardware dedicated for cryptocurrency trading is singularly unique.

BACKGROUND

Presently, investors invest for various purposes, such as growing wealth over time, achieving financial goals, preparing for retirement, or hedging inflation. Currently, there are a variety of investment options available, including but not limited to stocks, bonds, real estate, Exchange-Traded Funds (ETFs), and cryptocurrency. Among all these options, investors often choose their investments based on their risk tolerance, financial situation, time horizon and knowledge about the market.

Cryptocurrency is a relatively new investment option, which has several advantages such as operating on decentralized networks utilizing block chain technology and more accessible without specific trading hours and less geographic restrictions. Nevertheless, compared to the stock market, the cryptocurrency market may still be more intimidating for most investors due to a more significant fluctuation and limited knowledge of the cryptocurrency market. However, on the other hand, investors have found that the cryptocurrency market has the potential to be lucrative or profitable. Nevertheless, there is a potential security risk of trading bots being susceptible to hacking threats which may result in hackers gaining control of cryptocurrency funds and cryptocurrency accounts of the investors.

Consequently, what is needed is a system for cryptocurrency trading which is more secure and enhances the security of accessibility to prevent unauthorized access or theft.

SUMMARY OF THE INVENTION

The following is a concise summary of the invention presented herein with the primary aim of providing a preliminary understanding of certain aspects of the invention. It should be noted, however, that this summary is not intended to serve as a comprehensive overview of the invention or the boundaries of its scope. Its sole purpose is to provide a rudimentary understanding of the invention's concept and features, which will be expounded upon in greater detail in the ensuing sections.

The present disclosure generally discloses a system for cryptocurrency trading. An exemplary, nonlimiting embodiment of the present disclosure provides a system for cryptocurrency trading, hereinafter referred to as the "system", which comprises a home-based trading machine dedicated to trading cryptocurrencies. At least one set of application programming interface (API) credentials permissioned for cryptocurrency trading for an end user is stored securely on the home-based trading machine which is permissioned only to the internet protocol (IP) address of the end user, instead of a server. Further, the at least one set of API credentials comprises an API key and an API secret. The API key and the API secret are encrypted while transferring to the home-based trading machine. Consequently, the system minimizes the risk of unauthorized access to the API credentials and includes further measures in circumstances where the home-based trading machine is in theft.

The system generally comprises a home-based trading machine, a network, one or more servers, a database, and an electronic processing device accessible to a web browser.

The home-based trading machine comprises a central processing unit with a processor execution engine and a memory. The memory stores instructions executable by the processor execution engine to generate an encryption key configured to encrypt at least one set of application programing interface (API) credentials in an encrypted packet, receive, from an electronic processing device operable by a vendor of the encrypted packet, the encrypted packet, and store the encrypted packet in the memory of the home-based trading machine, implement the encryption key to decrypt the API key and the API secret key to unlock the encrypted packet to perform a cryptocurrency trade, and re-encrypt the API credentials upon completion of the cryptocurrency trade. The home-based trading machine may store API credentials from at least one currency exchange application. Each of the currency exchange application is accessible to the end user via their website and generates a unique set of API credentials for each of the end user, such that the home-based trading machine has access to each of the currency exchange applications. The API credentials further comprises an API key and an API secret for the currency exchange application to authenticate the end user.

As the API credentials are sensitive information, the system has a secured transferring process for the home-based trading machine to receive the API credentials without potentially compromising that information. The secured transferring process utilizes the electronic processing device operable by the vendor and preferably accessible to a web browser. The end user manually enters the encryption key generated by the home-based trading machine on a website operated by the vendor, and a client-side encryption process is executed client-side in the web browser in JavaScript using RSA encryption. The API credentials are encrypted in an encrypted packet, and securely transferred from the electronic processing device to the home-based trading machine. After the encrypted packet is transferred, a decryption process is only executed on the home-based trading machine when accessing the currency exchange application, and the API credentials are re-encrypted at rest, keeping the API credentials secure.

Further, the at-home trading hardware may further comprise a machine learning chip that optimizes data analysis and decision making for cryptocurrency trading. The home-based trading machine further comprises a kiosk application providing a user interface displayed on a touch screen on a top surface of the home-based trading machine configured to display data total profit, daily profit, account balances, and system health.

The above features and advantages will become apparent from the following detailed description taken with the accompanying drawings.

NUMBER REFERENCES

10—System for Cryptocurrency Trading
100—Cloud Hosting Platform
110—Database
112—Server
114—System Provider Application
114a—System Provider API
116—Website
200—Home-based Trading Machine
210—Background Services
211—Engine Service
212—Order Service
213—Socket Service
214—Health Service
215—Update Service
220—CPU
222—Memory
224—Touchscreen
230—USB Port
232—HDMI Port
234—DC Port
240—SIM Card Slot
242—Wi-Fi
244—LAN
246—4G
250—Power Source
260—Kiosk Application
300—Electronic Processing Device
410—First Currency Exchange Application
410a—First Currency Exchange API
420—Second Currency Exchange Application
420a—First Currency Exchange API
430—Third Currency Exchange Application
430a—First Currency Exchange API
500—Network

DETAILED DESCRIPTION OF THE INVENTION

The following detailed description and accompanying drawings provide a comprehensive disclosure of an exemplary embodiment for the purpose of facilitating one of ordinary skill in the relevant art to make and use the invention. As such, the detailed description and illustration of the one or more exemplary embodiments presented herein are purely exemplary in nature and are not intended to limit the scope of the invention or its protection in any matter. It is further noted that the drawings may not be to scale, and in some cases, certain details may be omitted which are not necessary for an understanding of the present invention, such as conventional details of fabrication and assembly.

The present disclosure is generally directed towards a system for cryptocurrency trading 10. An exemplary, non-limiting embodiment of the present disclosure provides a system for cryptocurrency trading, hereinafter referred to as the "system 10", is shown in FIG. 1, which comprises a home-based custom hardware trading machine 200 dedicated to cryptocurrency trading.

Figure 1:
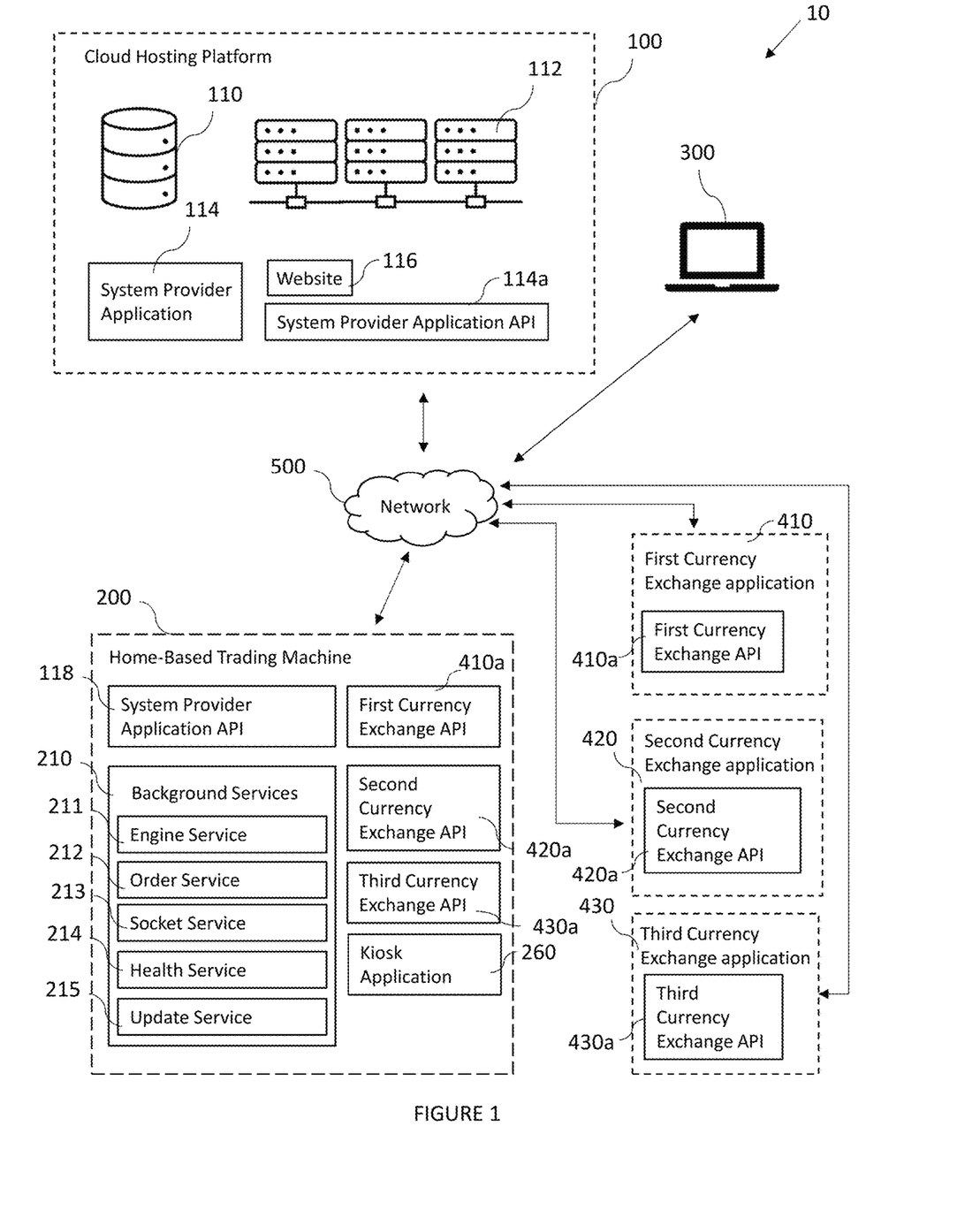
FIG. 1 depicts a schematic diagram that shows an exemplary embodiment of a system for cryptocurrency trading.

Referring to FIG. 1, the system 10 generally comprises the home-based trading machine 200 accessible to at least one currency exchange application 410, 420, 430, a cloud hosting platform 100, and an electronic processing device operable by a trading client 300, each of which is communicating via a network 500. In the exemplary embodiment, the home-based trading machine 200 is accessible to three currency exchange applications 410, 420, 430, each of which provides an API 410a, 420a, 430a. However, it is anticipated that the number of currency exchange applications may vary in number. The cloud hosting platform further comprises a database 110, a server 112, a system provider application 114 providing a system provider API 114a for the home-based trading machine 200, and a website 116 that is accessible to the electronic processing device 300. Preferably, the database 110 is a cloud-based database using structured query language (SQL) for querying and managing data. The home-based trading machine 200 further comprises a kiosk application 260 and background services 210 including an engine service 211, an order service 212, a socket service 213, a health service 214, and an update service 215. The kiosk application 260 is configured to provide a user interface to display data such as total profit, daily profit, and account balance. The home-based trading machine 200 is configured to retrieve cryptocurrency market data from the at least one currency exchange application 410, 420, 430, and the engine service 211 is configured to process the market data and provide predictions for opportunities to perform cryptocurrency trading. The order service 212 is configured to leverage the API 410a, 420a, 430a of the currency exchange application 410, 420, 430 to perform a cryptocurrency trade. The update service 214 is configured to update the home-based trading machine 200 with the latest software. The health service 214 is configured to monitor the health of the other services 211, 212, 213, 215 and the system 10 as a whole and may perform remediation where necessary.

Referring to FIG. 2 and FIGS. 4-11, the home-based trading machine 200 may further comprise a user interface, preferably a touch screen 224 on a top surface of the home-based trading machine 200 configured to display data such as total profit, daily profit, and account balance. Further, the home-based trading machine 200 provides at least one network interface including but not limited to Wi-Fi 242, fourth generation (4G) 246, local area network (LAN) 244, and further comprise a subscriber identity module (SIM) card slot 240 configured to receive a SIM card. It is also anticipated that the network interface may also include third generation (3G), fifth generation (5G), wide area network (WAN), or a combination thereof. In circumstances where the local area network 244 or Wi-Fi 242 is disconnected, the home-based trading machine automatically switches over to the SIM card and may still have access to the network 500.

Figure 2:
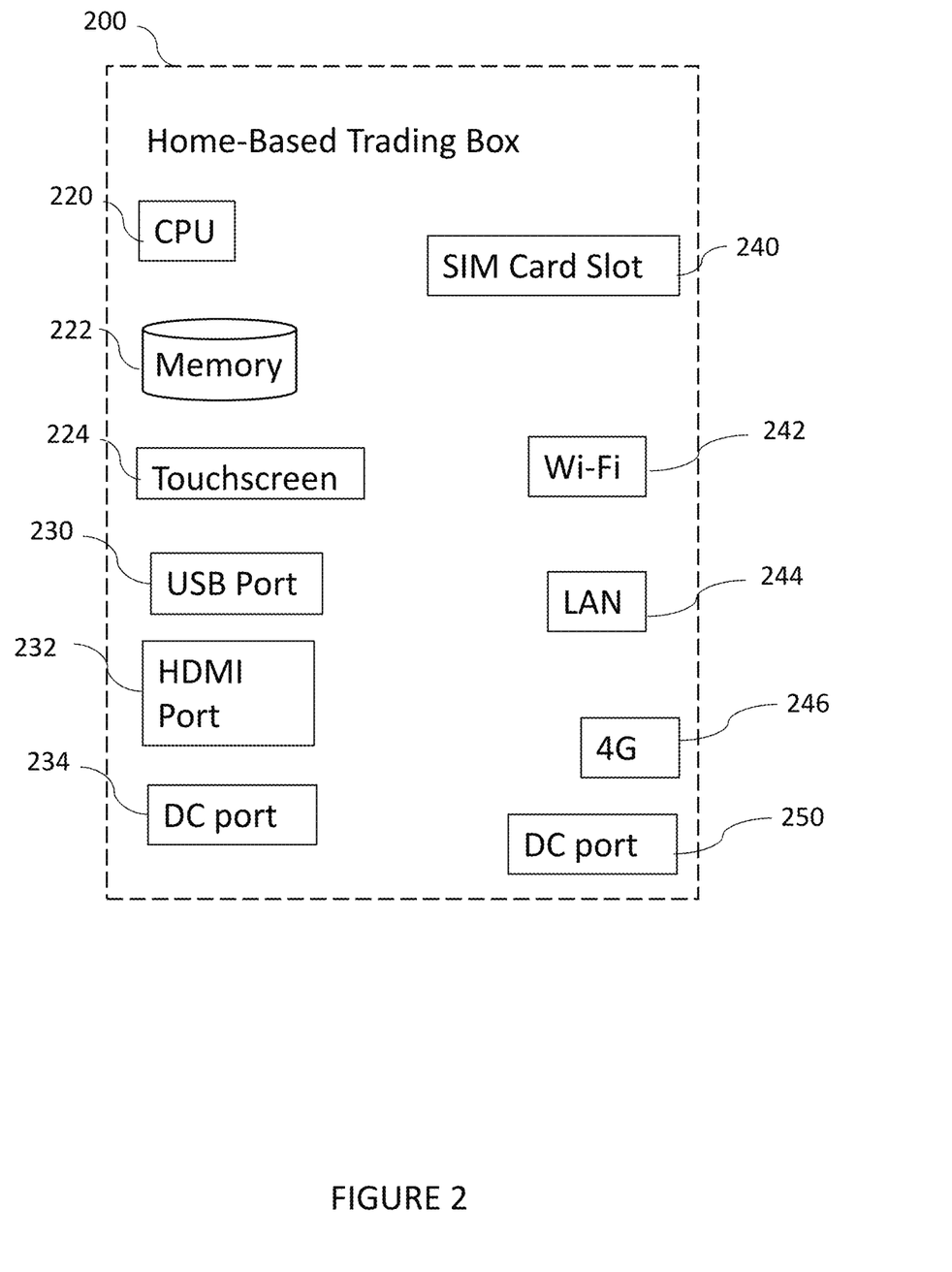
FIG. 2 depicts a schematic diagram that shows a home-based trading machine.

In addition, the home-based trading machine 200 further comprises input/output ports such as a USB port 230, a HDMI port 232, and a DC port 234. It is also anticipated that the home-based trading machine may include a built-in backup power source 250 to provide power in circumstances where the regular power source is disconnected, as network access and power are critical in cryptocurrency trading.

The home-based trading machine 200 of each of the end user may further be connected to a cold storage device, and the end user may transfer funds to the cold storage device, configured automatically. The home-based trading machine 200 may provide the option to transfer a predetermined percentage of the daily profit to the cold storage device.

Figure 3:
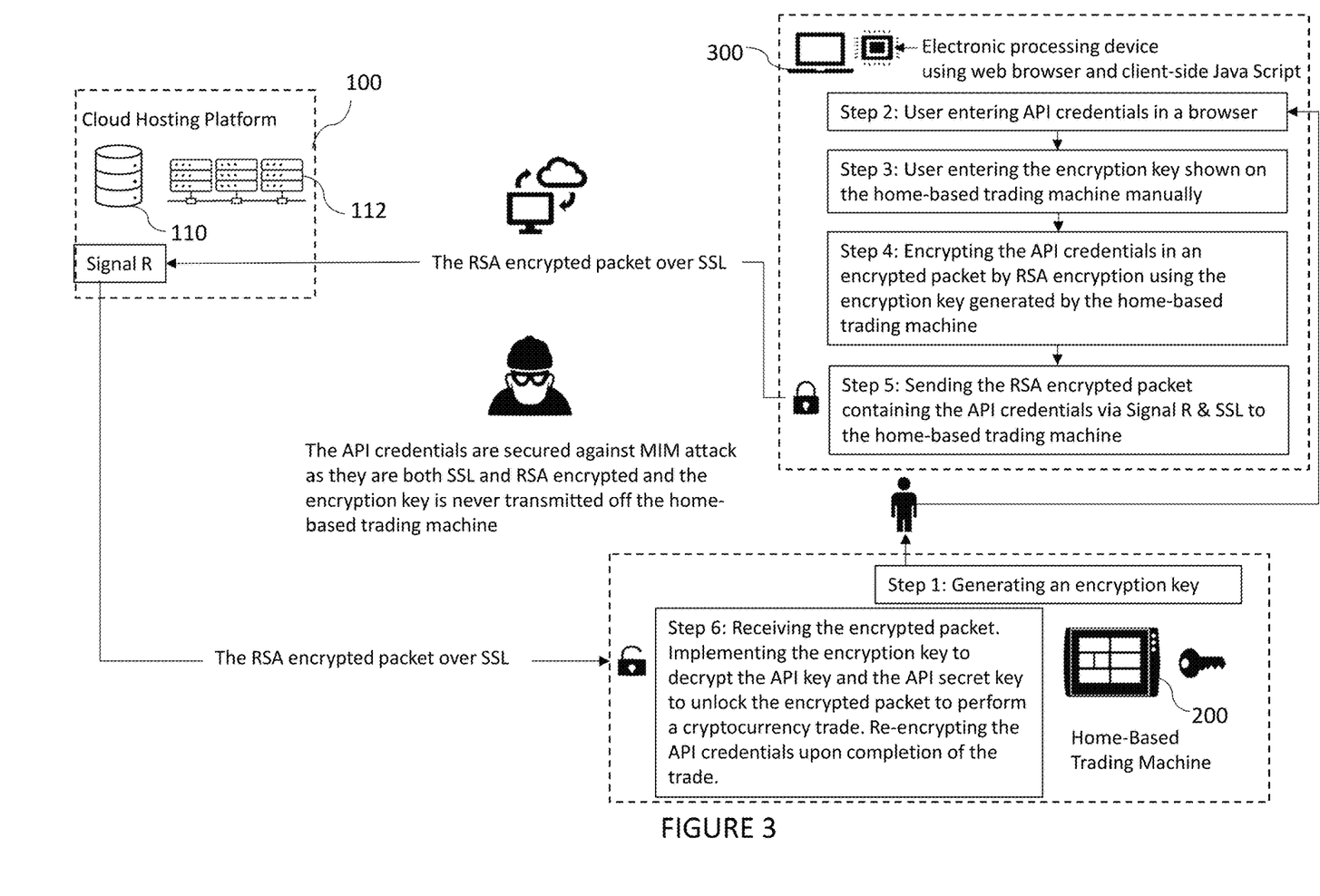
FIG. 3 depicts a schematic diagram that shows an exemplary embodiment of a method for transferring API credentials for cryptocurrency trading.
Figure 4:
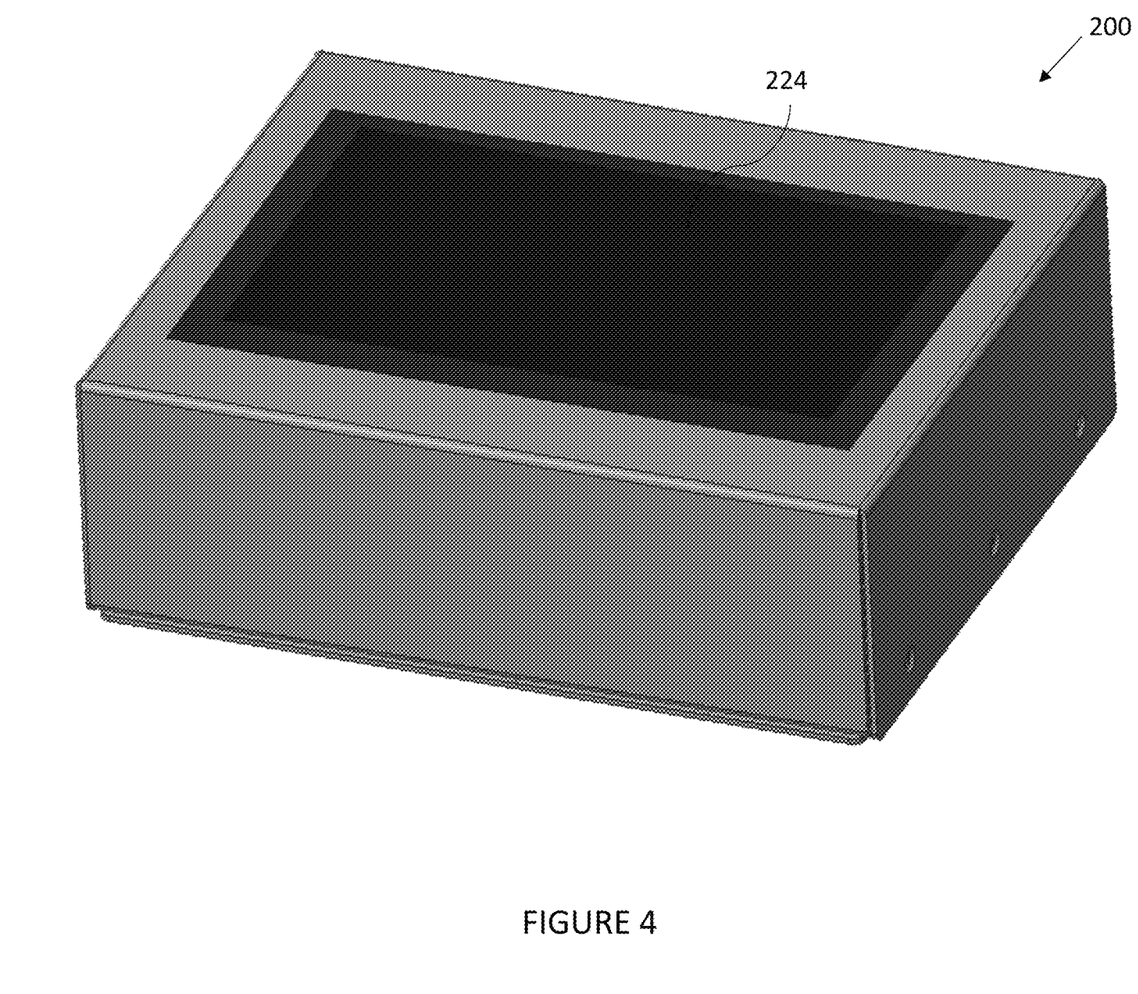
FIG. 4 is a front perspective view of an exemplary embodiment of a home-based trading machine.
Figure 5:
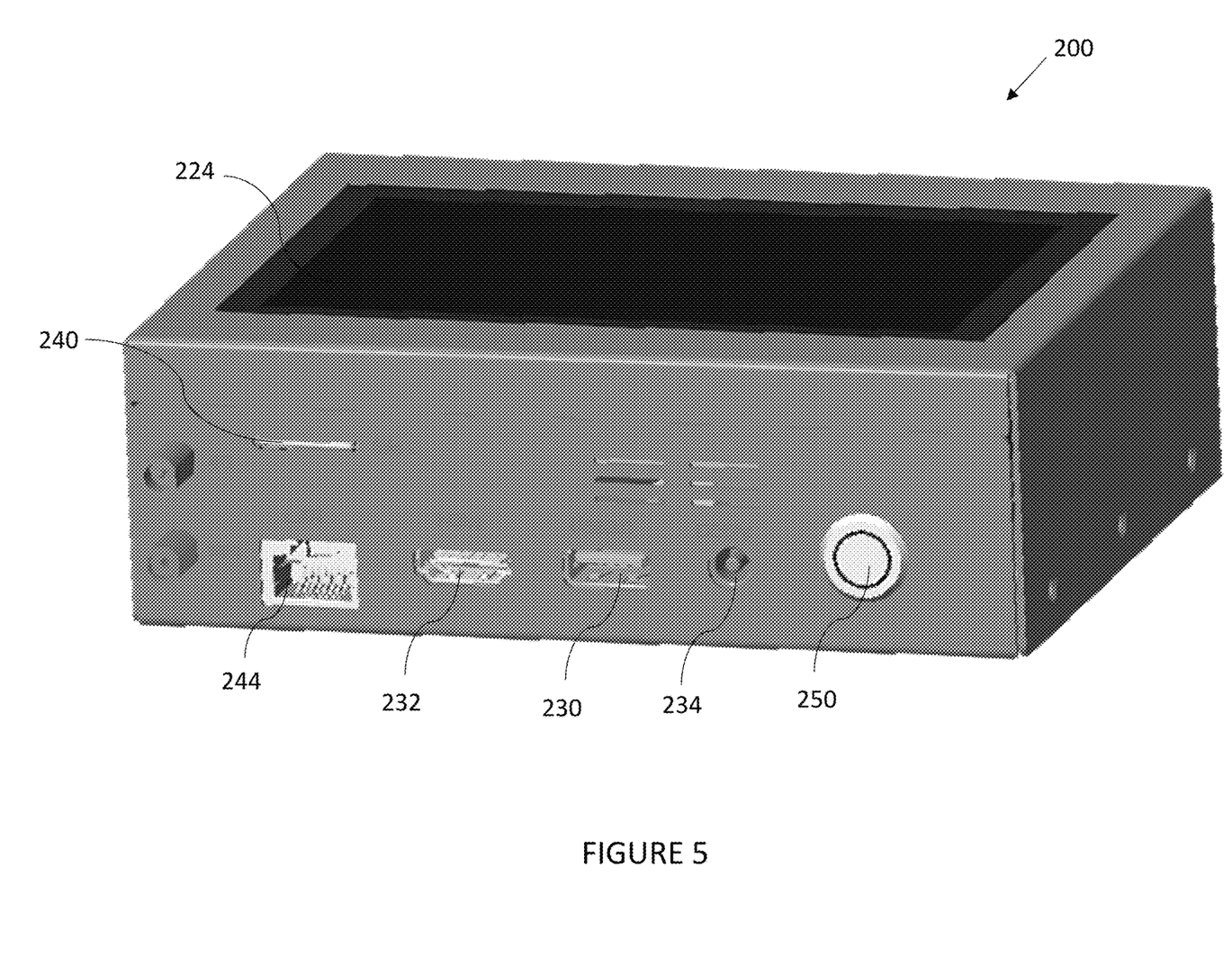
FIG. 5 is a first rear perspective view of the exemplary embodiment of the home-based trading machine.
Figure 6:
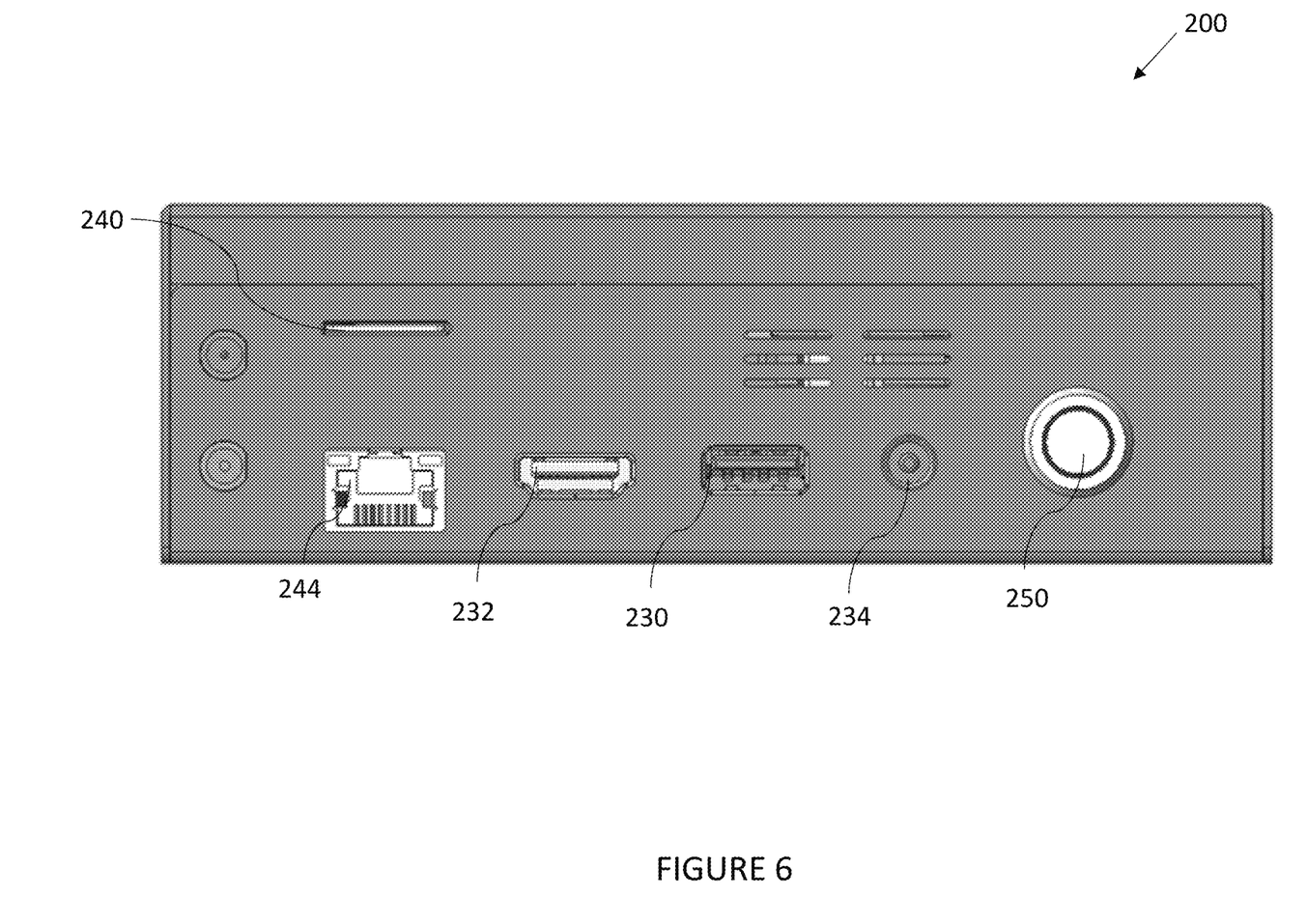
FIG. 6 is a rear view of the exemplary embodiment of the home-based trading machine.
Figure 7:
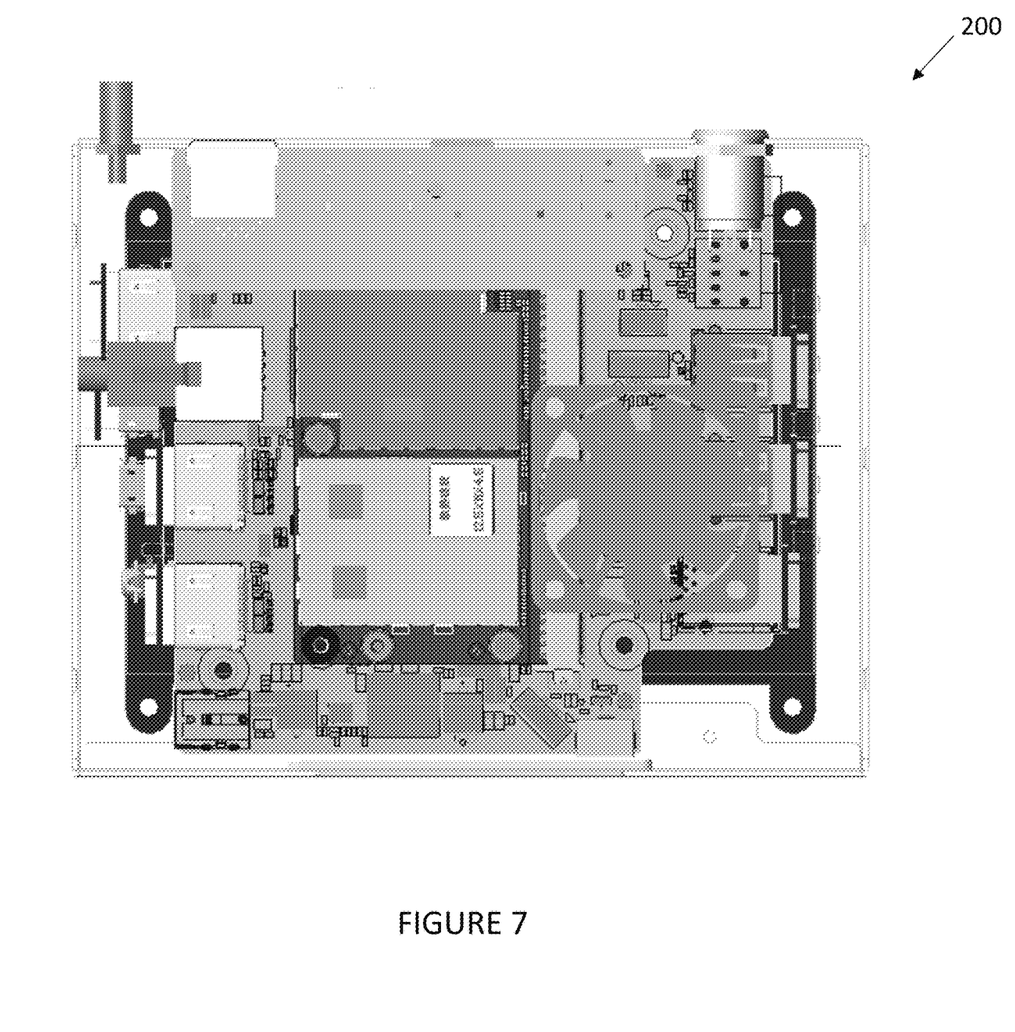
FIG. 7 is a top view of the exemplary embodiment of depicting partial of the home-based trading machine.
Figure 8:
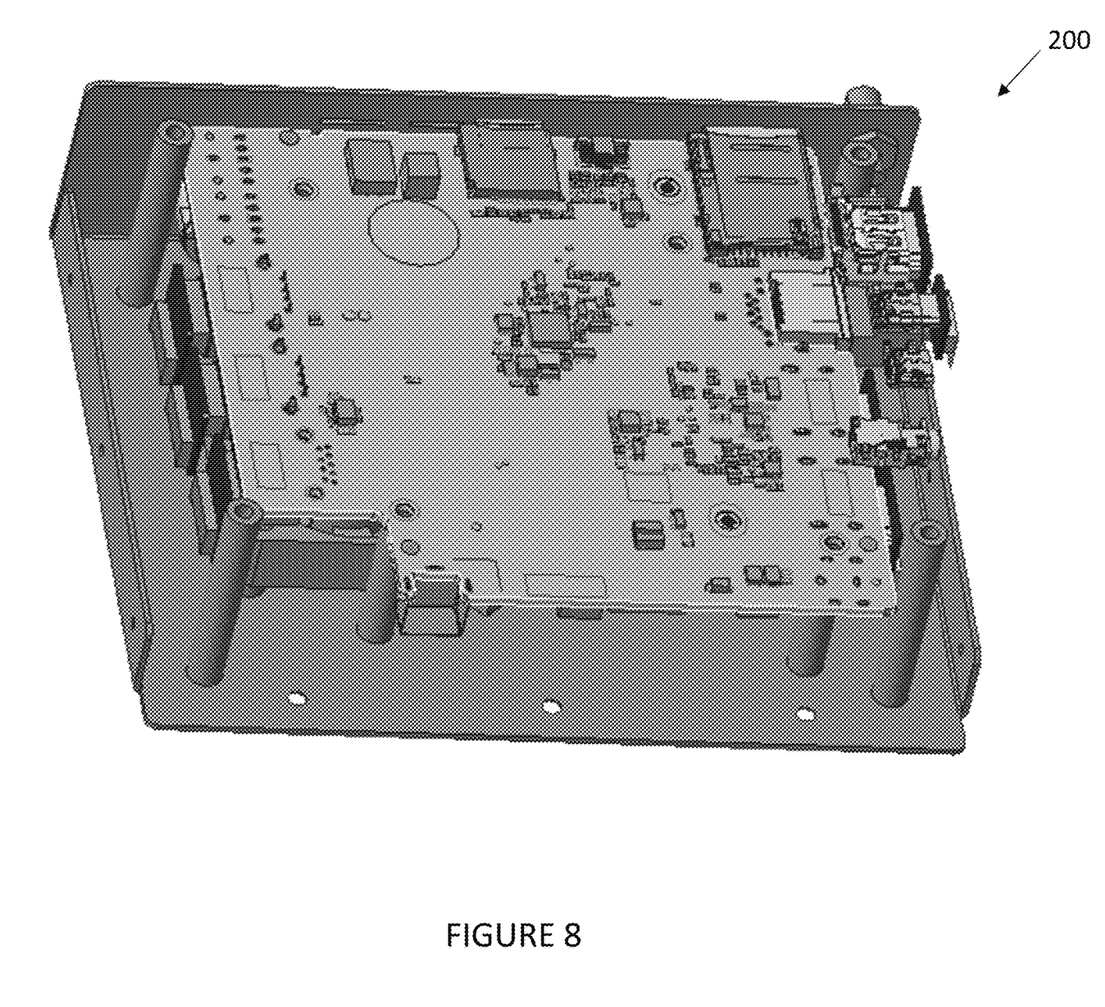
FIG. 8 is a first top perspective view of the exemplary embodiment of depicting partial of the home-based trading machine.
Figure 9:
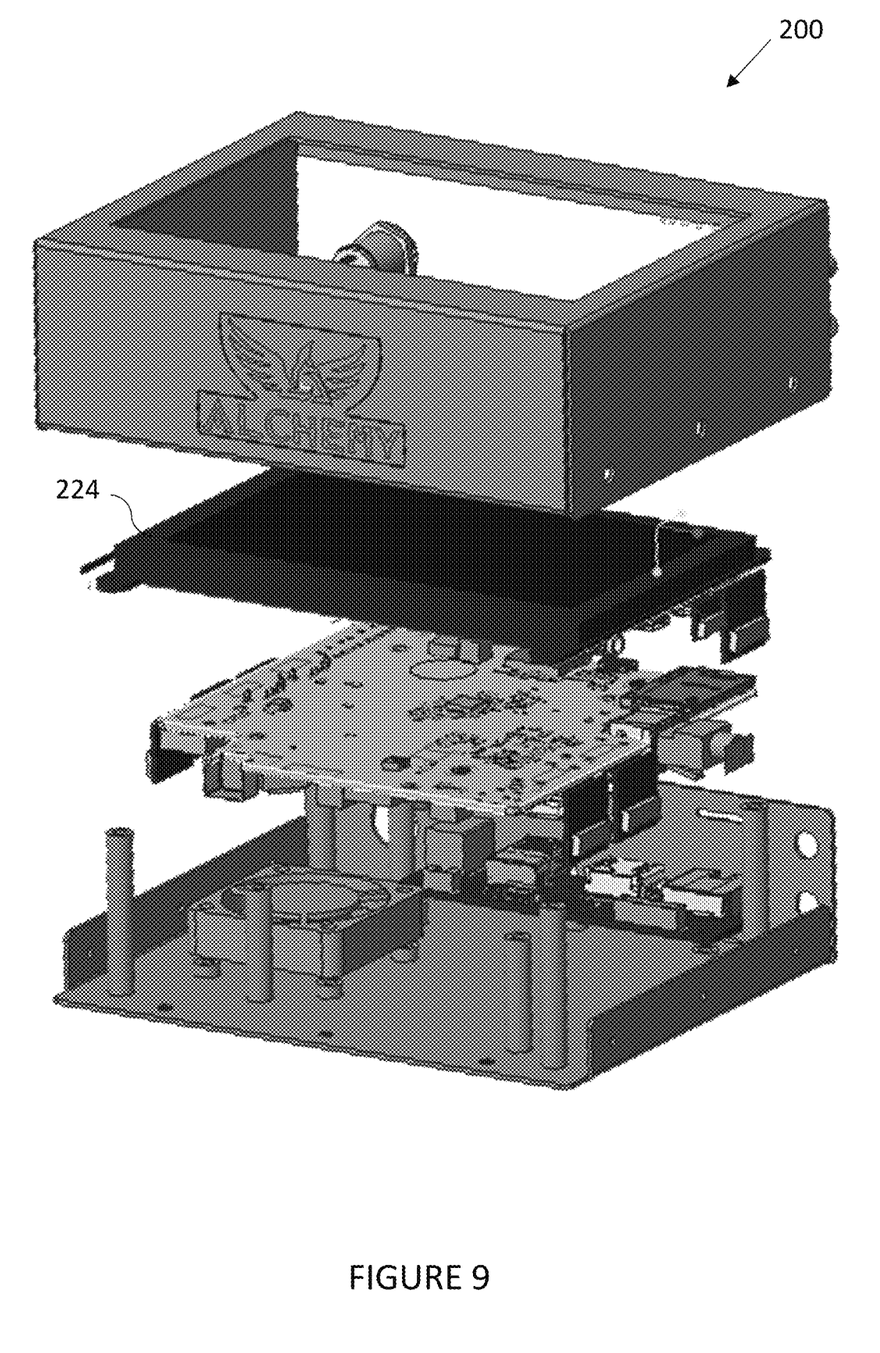
FIG. 9 is an explosive view of the exemplary embodiment of the home-based trading machine.
Figure 10:
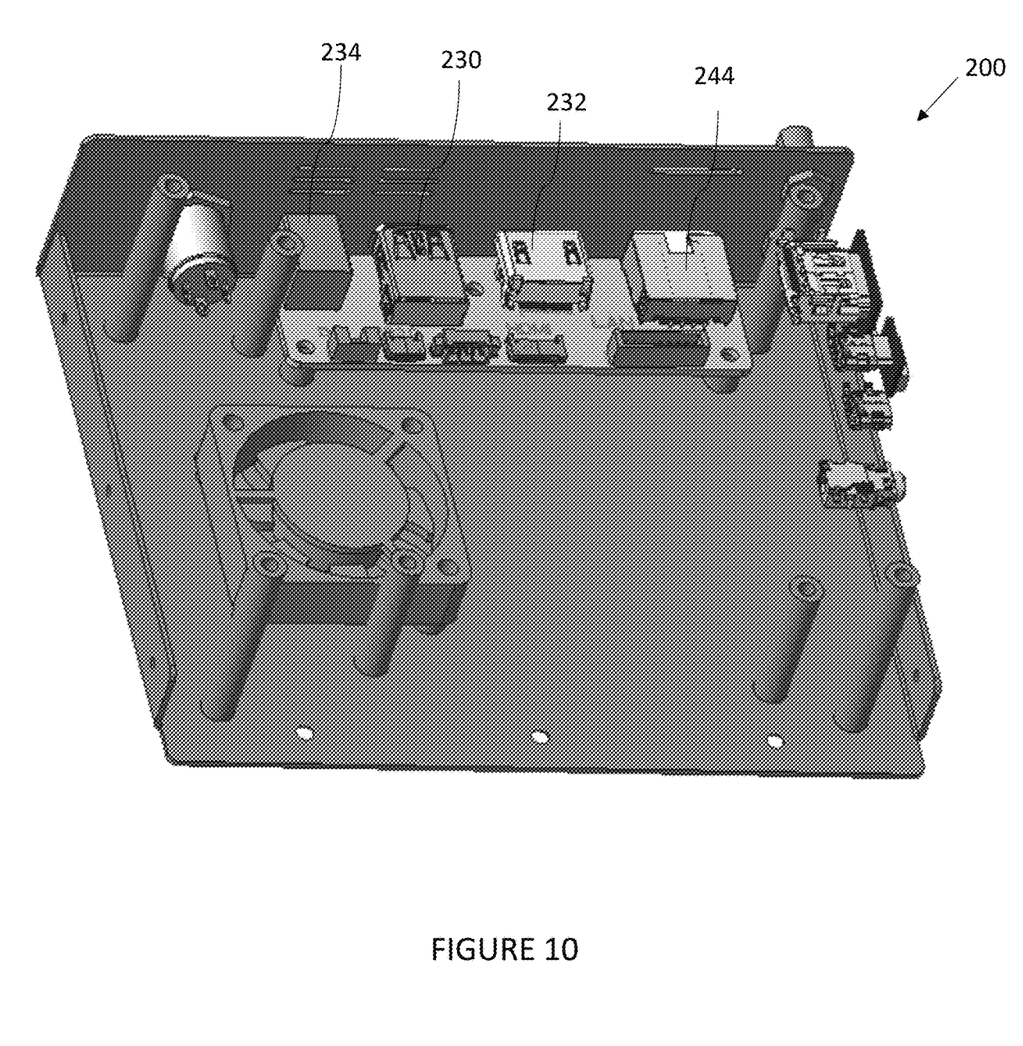
FIG. 10 is a second top perspective view of the exemplary embodiment of depicting partial of the home-based trading machine.
Figure 11:
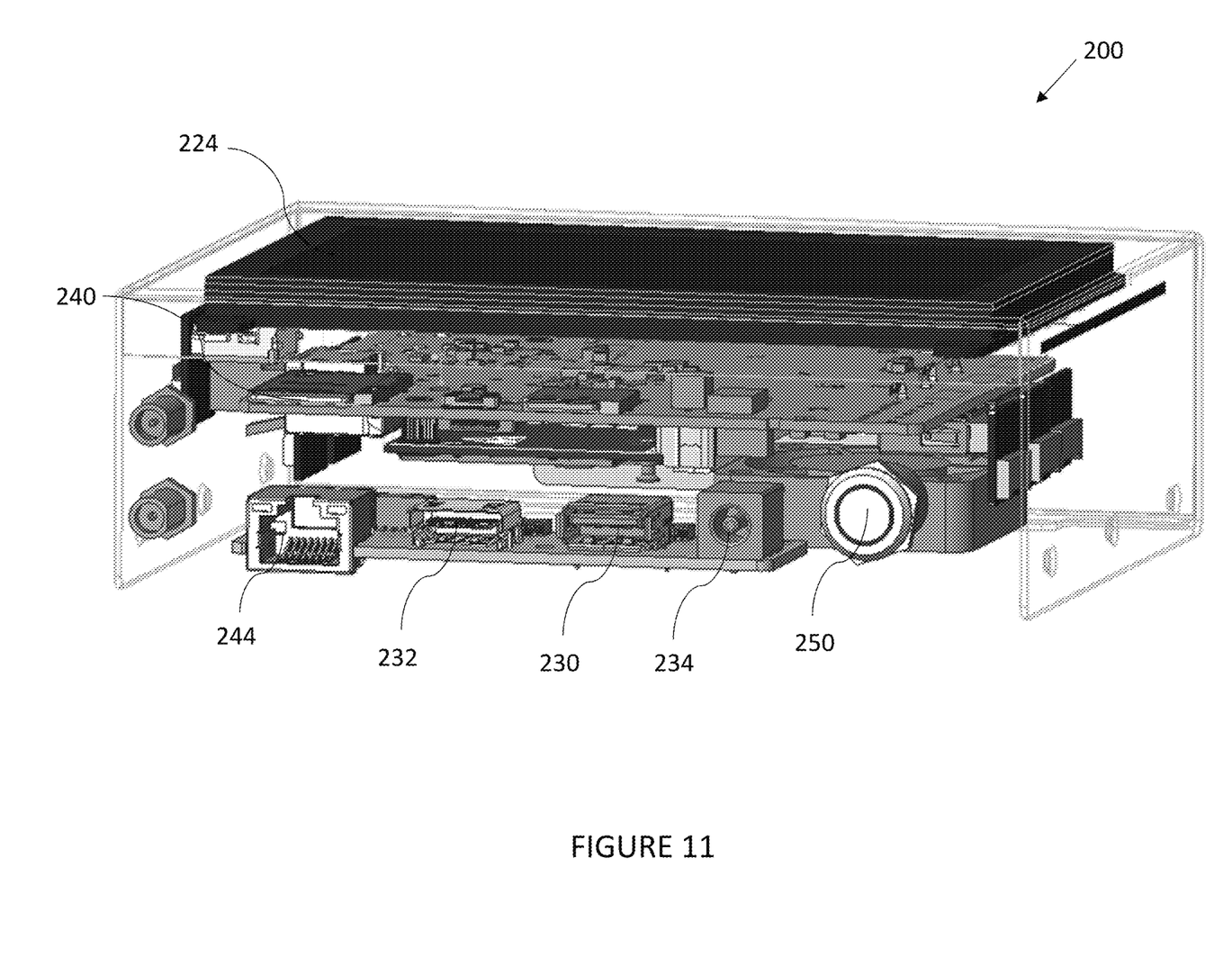
FIG. 11 is a second rear perspective view of the exemplary embodiment of the home-based trading machine showing hardware components.

An exemplary method of securely transferring API credentials for cryptocurrency trading, as shown in FIG. 3, is presented herein to further demonstrate the security of the system and how it minimizes the risk of unauthorized access. It is anticipated that several steps may be sequentially interchangeable and equivalent application of one or more permutations of such sequentially interchangeable steps does not alter the spirit of the invention in any meaningful way.

First, the home-based trading machine 200 generates an encryption key configured to encrypt at least one API credentials generated by the at least one currency exchange application 410, 420, 430 for an end user. The API credentials further comprises an API key and an API secret key. Next, on an electronic processing device 300, the end user enters the generated API credentials to a website 116 via a web browser. Then, the end user enters the encryption key shown on the home-based trading machine 200 manually on the website 116. Still next, the API credentials are encrypted in an encrypted packet by RSA encryption in JavaScript by Rivest, Shamir, Adleman (RSA) encryption using the encryption key generated by the home-based trading machine 200. Then the RSA encrypted packet is sent via Signal R and Secure Sockets Layer (SSL) through the server 112 and to the home-base trading machine 200. Lastly, the home-based trading machine 200 receives the encrypted packet. The encrypted packet is decrypted when accessing the currency exchange application 410, 420, 430 to perform a cryptocurrency trade, and upon completion, the API credentials are re-crypted. Consequently, during the transferring process, the API credentials are secured against man-in-the-middle (MIM) attack, as the API credentials are both SSL and RSA encrypted. Moreover, the API credentials are only stored on the home-based trading machine 200, and never stored on the server 112, and the encryption key is never transmitted off the home-base trading machine 200.

In another aspect, it is anticipated that prior to performing a cryptocurrency trading, the home-based trading machine 200 may generate predictions, and a broker may further determine whether to proceed the cryptocurrency trading based on the predictions.

In addition, the home-based trading machine 200 may comprise a machine learning chip that optimizes data analysis and decision making for cryptocurrency trading. For additional security measures, the home-based trading machine 200 is assigned and permissioned only to the Internet Protocol (IP) address of the end user. As a result, if the home-based trading machine 200 is in theft and the assigned IP address is not identified, the home-based trading machine 200 will be deactivated.

In a second exemplary, nonlimiting embodiment, the system comprises two or more end users, and each of the end users has a home-based trading machine 200. The home-based trading machines 200 may cooperate and share market analysis and computation to optimize predictions.

Advantageously, the home-based trading machine 200 is in wireless communication to the electronic processing device operable by the trading client 300, the three currency exchange applications 410, 420, 430, and the cloud hosting platform 100. The home-based trading machine 200 provides a secure device to reduce or eliminate a potential security risk hacking threats which may result in hackers gaining control of cryptocurrency funds and cryptocurrency accounts of the investors. For example, the API key and an API secret key generated by the home-based trading machine 200 reduce or eliminate such security risks. In addition, the API credentials are only stored on the home-based trading machine 200, and never stored on the server 112, and the encryption key is never transmitted off the home-base trading machine 200, further reducing or eliminating such security risks.

While the exemplary embodiment of the present disclosure has been disclosed, certain modifications may be made by those skilled in the art to modify the invention without departing from the spirit of the invention.

The invention claimed is:

1. A home-based trading machine, comprising:
   a central processing unit (CPU); and
   a memory storing instructions executable by a processor execution engine of the CPU to:
   generate an encryption key configured to encrypt at least one set of application programing interface (API) credentials in an encrypted packet, wherein the at least one set of API credentials comprise an API key and an API secret key, wherein the at least one set of API credentials provide access to at least one currency exchange application;
   receive, from an electronic processing device operable by a vendor of the encrypted packet, the encrypted packet, and store the encrypted packet in the memory of the home-based trading machine;
   implement the encryption key to decrypt the API key and the API secret key to unlock the encrypted packet to perform a cryptocurrency trade; and
   upon completion of the cryptocurrency trade, re-encrypt the API credentials.

2. The home-based trading machine as described in claim 1, wherein the home-based trading machine further comprises a touch screen.

3. The home-based trading machine as described in claim 1, wherein the home-based trading machine further comprises a machine learning chip.

4. The home-based trading machine as described in claim 1, wherein the home-based trading machine provides at least one network interface.

5. The home-based trading machine as described in claim 4, wherein the at least one network interface comprises WiFi, third generation (3G), fourth generation (4G), fifth generation (5g), local area network (LAN), wide area network (WAN), or a combination thereof.

6. The home-based trading machine as described in claim 1, wherein the home-based trading machine further comprises a subscriber identity module (SIM) card slot.

7. The home-based trading machine as described in claim 1, wherein the home-based trading machine is assigned to an internet protocol (IP) address.

8. The home-based trading machine as described in claim 7, wherein the home-based trading machine deactivates when the IP address is unidentified.

9. The home-based trading machine as described in claim 1, wherein the home-based trading machine further comprises a high-definition multimedia interface (HDMI) port.

10. The home-based trading machine as described in claim 1, wherein the home-based trading machine further comprises a universal serial bus (USB) port.

11. A system for cryptocurrency trading comprising:
   a. a home-based trading machine comprising:
      a central processing unit (CPU); and
      a memory storing instructions executable by a processor execution engine of the CPU to:
         generate an encryption key configured to encrypt at least one set of application programing interface (API) credentials in an encrypted packet, wherein the at least one set of API credentials comprise an API key and an API secret key, wherein the at least one set of API credentials provide access to at least one currency exchange application;
         receive, from an electronic processing device operable by a vendor of the encrypted packet, the encrypted packet, and store the encrypted packet in the memory of the home-based trading machine;
         wherein the electronic processing device is accessible to a web browser and is configured to receive the encryption key manually entered by an end user and transfer the encrypted packet to the home-based trading machine via the web browser;
         implement the encryption key to decrypt the API key and the API secret key to unlock the encrypted packet to perform a cryptocurrency trade; and
         upon completion of the cryptocurrency trade, re-encrypt the API credentials;
   b. one or more servers;
   c. at least one database;
      wherein the database communicates with the one or more servers; and
   d. a network;
      wherein the home-based trading machine, the one or more server, the database, and the electronic processing device communicates with each other via the network.

12. The system as described in claim 11, wherein the memory further stores instructions executable by the processor execution engine of the home-based trading machine to provide updates to the system.

13. The system as described in claim 11, wherein the memory further stores instructions executable by the processor execution engine of the home-based trading machine to monitor health of the system.

14. The system as described in claim 11, wherein the home-based trading machine further comprises a touch screen.

15. The system as described in claim 11, wherein the home-based trading machine comprises a machine learning chip.

16. The system as described in claim 11, wherein the home-based trading machine provides at least one network interface.

17. The system as described in claim 16, wherein the at least one network interface comprises WiFi, third generation (3G), fourth generation (4G), fifth generation (5g), local area network (LAN), wide area network (WAN), or a combination thereof.

18. The system as described in claim 11, wherein the wherein the home-based trading machine further comprises a subscriber identity module (SIM) card slot.

19. The system as described in claim 11, wherein the home-based trading machine is assigned to an internet protocol (IP) address.

20. The system as described in claim 19, wherein the home-based trading machine deactivates when the IP address is unidentified.

* * * * *